3,829,398
PLASTICIZED VINYL CHLORIDE POLYMER COMPOSITION FOR TRANSPARENT PACKING FILM
Yoshikatsu Ogawa, Keiji Katada, Mitsuhiro Nakano, and Kozi Yasumatsu, Osaka, Japan, assignors to Marubishi Yuka Kogyo Kabushiki Kaisha, Osaka, Japan
No Drawing. Continuation of abandoned application Ser. No. 157,603, June 28, 1971. This application June 6, 1973, Ser. No. 367,570
Claims priority, application Japan, Oct. 12, 1970, 45/88,775
Int. Cl. C08f 45/40
U.S. Cl. 260—31.8 R                    4 Claims

ABSTRACT OF THE DISCLOSURE

Transparent plasticized vinyl chloride polymer film for packing perishable foodstuffs is improved in its resistance against clouding that is, frosting which occurs due to the condensation of moisture evaporated from perishable foodstuffs packed with the film, by incorporating thereinto a small amount of a mixture of ethylene oxide-added sorbitan higher fatty acid ester and ethylene oxide-added glycerin higher fatty acid ester.

---

This is a continuation of application Ser. No. 157,603, filed June 28, 1971 now abandoned.

This invention relates to a plasticized vinyl chloride polymer composition, more particularly to a plasticized vinyl chloride polymer composition having an improved antifrosting property and being suitable for transparent film for packing perishable foodstuffs.

Vinyl chloride polymer films or sheets containing a nontoxic plasticizer, which are normally transparent, are of great use in packing perishable foodstuffs such as vegetables, fruits, meat, pork products, poultry and the like and in agricultural or horticultural use.

Conventional vinyl chloride polymer films or sheets, have the desired effect on preservation of freshness of such perishable foodstuffs and on prevention of them against soiling. However, the films or sheets have such a defect that they readily become opaque with dew, i.e. small drops of water condensated on an inner surface thereof, particularly at the time when temperature falls, which is due to moisture contained in perishable foodstuffs. Thus, the films or sheets become opaque and foodstuffs cannot be seen through them. The reason for the above is believed that, since plasticized vinyl chloride polymer has hydrophobic property, small drops of water having been condensed on the surface thereof do not diffuse and accordingly, the films do not become uniformly wet over the entire surface. The opaqueness not only depreciates their value as commodities from the view point of package attractiveness and the foodstuffs not being seen therethrough, but also, deteriorates the quality of foodstuffs in the package.

In order to obviate the above defect, many attempts have been proposed heretofore, some of which have already been put to practical use. Most practical methods now are those in which antifrosting agents are incorporated into thermoplastic polymeric material to be shaped into film, such as polyvinyl chloride, polypropylene, polyethylene, polystyrene and the like. "Antifrosting agent" in the specification is meant by the materials which have a function preventing transparent film or sheet from becoming opaque with dew or frost, i.e. small drops of water condensed on a surface of the films or sheet.

Known antifrosting agents include, for example, sorbitan higher fatty acid ester, pentaerythritol higher fatty acid ester and their ethylene oxide-addition compound; ethylene oxide-addition compound of higher alkylamine, glycerine higher fatty acid ester and the like. However, known antifrosting agents have some of the following defects: when they are incorporated into plasticized vinyl chloride polymer, (a) thermal resistance of resultant vinyl chloride polymer material deteriorates, occasionally resulting in the vinyl chloride polymer material not being capable of withstanding temperatures at which it would ordinarily be shaped into film or sheet, (b) antifrosting effect does not last for a long period of time, (c) antifrosting agent does not function in the required manner immediately after the film starting being used as packing material and (d) antifrosting effect is considerably minimized at low temperatures near the freezing point (0° C.).

It has now been found that the above-listed defects can be obviated by the incorporation of two kinds of particular nonionic compounds in particular proportions into plasticized chloride polymer material.

An object of this invention is to provide a plasticized vinyl chloride polymer composition having an improved antifrosting property and being suitable as a transparent film for use in packing of perishable foodstuffs and in agriculture or horticulture.

Another object of this invention is to provide a film or sheet having high heat stability and exhibiting an improved antifrosting effect, which is long lasting, secured at the time immediately after the film starts being used as packing material and is not minimized to any great extent even at excessively low temperatures.

Other objects and advantages will become apparent from the following description.

According to the present invention, a plasticized vinyl chloride polymer composition having improved antifrosting property, which comprises (a) vinyl chloride polymer,
(b) 30 to 60 parts by weight, based on 100 parts by weight of the vinyl chloride polymer, of nontoxic plasticizer, and
(c) 0.5 to 3 parts by weight, based on 100 parts by weight of the vinyl chloride polymer, of a mixture of 10 to 90% by weight of ethylene oxide-added sorbitan higher fatty acid ester and 90 to 10% by weight of ethylene oxide-added glycerin in higher fatty acid ester, is provided.

Vinyl chloride polymer, to which the present invention relates, includes not only vinyl chloride homopolymer, but also copolymers consisting essentially of a vinyl chloride unit, as a main component, and another monomer unit such as vinyl acetate, vinylidene chloride and the like, as a minor component.

An antifrosting agent component (c) in the composition is a mixture of two kinds of esters, i.e., both sorbitan and glycerin esters of higher fatty acid, to which a predetermined molar number of ethylene oxide have been added. Higher fatty acids, which may be used for the preparation of both esters, include, for example, palmitic acid, stearic acid, oleic acid, myristic acid and the like. Optimum higher fatty acids are stearic acid and palmitic acid. Added amounts of ethylene oxide to both sorbitan and glycerin higher fatty acid esters are 1 to 5 mole parts based on a molar part of the higher fatty acid ester. Both sorbitan and glycerin higher fatty acid esters, to which ethylene oxide has not been added, do not bring about the desired antifrosting effect at excessively low temperatures, particularly at a range of 0° C. to 5° C. On the contrary, the esters, to which ethylene oxide in excess of the above limit has been added, inevitably lead to reduction of heat stability of the resultant vinyl chloride polymer composition. Workability of the latter composition at the time of shaping into film is accordingly reduced.

Further, it is noted that, when each of the sorbitan and glycerin-higher fatty acid esters is employed alone, it functions only in the similar manner to that of conventional antifrosting agents. However, when both sorbitan- and glycerin-esters are employed together, they surprisingly achieve a synergistic effect, as apparent from the below example. With regard to the mixing ratio of both sorbitan and glycerin esters, generally, each should be present at percentages of 10 to 90% by weight. Preferably, both sorbitan and glycerin esters should be present at percentages of 30 to 50% by weight and 70 to 50% by weight, respectively. When a mixing ratio of both esters is outside the range, a synergistic effect cannot be expected.

Only a very small amount of a mixture of both esters need be present in the plasticized vinyl chloride polymer in order for at least a small amount of benefit to be obtained. However, generally for most uses, a relatively high degree of antifrosting of the vinyl chloride polymer is desired. Therefore, at least 0.5 parts by weight, based on 100 parts by weight of the vinyl chloride polymer, of the esters should be present in the composition. While there is apparently no critical upper limit with regard to the amount of esters that can be used in the composition of the present invention, generally, at most, about 3.0 parts by weight, based on 100 parts by weight of the vinyl chloride polymer, of the esters should be used. For optimum results, it is preferred that the total amount of both esters present in the composition of the present invention is within the range of about 1.0 to about 1.5 parts by weight.

It is also noted that soft vinyl chloride resin containing proper amounts, i.e. 30 to 60 parts by weight, based on 100 parts by weight of the vinyl chloride resin, of nontoxic plasticizer, exhibits the desired effect in the case where sorbitan- and glycerin-esters are incorporated thereinto. On the contrary, rigid (unplasticized) or semi-rigid vinyl chloride resin is not improved so much in its frosting property even if both esters are incorporated thereinto. Nontoxic plasticizers used in the present invention include ordinarily available nontoxic plasticizers such as di-2-ethylhexyl phthalate (DOP), di-n-octyl phthalate (DnOP), di-2-ethylhexyl adipate (DOA) and the like.

Apparently, the particular manner whereby both sorbitan and glycerin-esters are incorporated into the vinyl chloride polymer is also not critical. The esters can, for example, be simply physically mixed with powdered, flaked or paste vinyl chloride polymer prior to or at the time of melting or kneading the materials together in a shaping apparatus, e.g. extruder or calender. In any event, apparently all that is needed to effectively prevent the vinyl chloride polymer from clouding with the esters, is to uniformly disperse or dissolve the esters through the polymers. If desired, proper amounts of other additives such as antioxidant, UV absorber, filler, colorant and the like may be incorporated into the vinyl chloride polymer composition of the present invention, unless they lower the quality of the resulting transparent film or sheet.

The invention will be further illustrated with reference to the example, in which all "parts" and "percent" are by weight.

EXAMPLE

| | Parts |
|---|---|
| Commercially available polyvinyl chloride (for soft resin) | 100 |
| Antifrosting agent | 1.5 |
| Commercially available Ca-Zn-containing a stabilizing agent | 3.0 |
| DOP | 40 |

A mixture containing the above composition was kneaded at temperatures of 160 to 165° C. for approximately 10 minutes by mixing rolls and then, shaped through calender rolls into film.

The film, into which antifrosting agents of the present invention had been incorporated, was colorless and transparent, which was quite the same as vinyl chloride polymer film not containing antifrosting agents, illustrating that antifrosting agents of the present invention did not affect the heat stability of the vinyl chloride polymer in the least.

Cabbage was packed with various films and placed in a refrigerator maintained at temperatures of 1 to 3° C. Occurrence of frost, at the time when the appointed days passed, was observed. Results are given in Table 1, below.

Antifrosting agents used in the example were as follows:

I: Poly[3]*oxyethylene sorbitan monostearate (30%) +poly[3]oxyethylene glycerin monostearate (hereinafter referred to as "A," for short) (70%)
II (control): A
III (control): Poly[3]oxyethylene sorbitan monostearate
IV (control): Sorbitan monostearate
V: Poly[3]oxyethylene sorbitan monolaurate (30%)+A (70%)
VI: Poly[3]oxyethylene sorbitan monomyristate (30%) +A (70%)
VII: Poly[3]oxyethylene sorbitan monopalmitate (30%) +A (70%)
VIII: Poly[3]oxyethylene sorbitan mono-oleate (30%) +A (70%)
IX (control): The same as "I" (but, plasticizer had not been incorporated into the composition)
X (control): Poly[3]oxyethylene sorbitan monostearate (95%)+A (5%)
XI (control): Poly[3]oxyethylene sorbitan monostearate (5%)+A (95%)
XII (control): Blank

TABLE 1

Appearance of the film at the time when a day passed
I: Frost did not occur, transparent
II: Frost partially occurred, translucent
III: Frost partially occurred, translucent
IV: Frost partially occurred, opaque
V: Slight frost partially occurred, transparent or translucent
VI: Slight frost partially occurred, transparent or translucent
VII: Frost did not occur, transparent
VIII: Slight frost partially occurred, transparent or translucent
IX: Frost wholly occurred, opaque
X: Frost partially occurred, translucent
XI: Frost partially occurred, translucent
XII: Frost wholly occurred, opaque With regard to all the films used, appearance at the time when 5, 10, 15, 20, 30 and 60 days passed were observed. However, the change of appearances was not observed except that the transparency of sample No. IV slightly rose at the time when 60 days passed in comparison with that at the time when 30 days passed, illustrating that the use of only sorbitan monostearate produces a very tardy effect.

What we claim is:
1. A plasticized vinyl chloride polymer composition having an improved antifrosting property, which comprises
   (a) polyvinyl chloride,
   (b) 30 to 60 parts by weight, based on 100 parts by weight of said polyvinyl chloride, of a non-toxic plasticizer, and
   (c) 0.5 to 3 parts by weight, based on 100 parts by weight of said polyvinyl chloride of an antifrosting agent consisting essentially of 30 to 50% by weight of an ethylene oxide adduct of a sorbitan higher fatty acid ester in which adduct the number of combined ethylene oxide units is 1 to 5 per molecule of said ester and 70 to 50% by weight of an ethylene oxide adduct of a glycerin higher fatty acid ester in

*A numerical value, within the brackets [ ], of esters indicates an average molar number of ethylene oxide having been added to the esters.

which adduct the number of combined ethylene oxide units is 1 to 5 per molecule of said ester.

2. A plasticized vinyl chloride polymer composition as claimed in claim 1, wherein each of said esters is a monoester.

3. A plasticized vinyl chloride polymer composition as claimed in claim 1, wherein each of said higher fatty acids is a member selected from the group consisting of palmitic acid, stearic acid, oleic acid and myristic acid.

4. A transparent vinyl chloride polymer film having an improved antifrosting property, which comprises
  (a) polyvinyl chloride,
  (b) 30 to 60 parts by weight, based on 100 parts by weight of said polyvinyl chloride, of an antifrosting plasticizer, and
  (c) 0.5 to 3 parts by weight, based on 100 parts by weight of said polyvinyl chloride of an antifrosting agent consisting essentially of 30 to 50% by weight of an ethylene oxide adduct of a sorbitan higher fatty acid ester in which adduct the number of combined ethylene oxide units is 1 to 5 per molecule of said ester and 70 to 50% by weight of an ethylene oxide adduct of a glycerin higher fatty acid ester in which adduct the number of combined ethylene oxide units is 1 to 5 per molecule of said ester.

References Cited
UNITED STATES PATENTS

| | | | |
|---|---|---|---|
| 3,479,308 | 11/1969 | Gattenby et al. | 260—23 XA |
| 3,048,266 | 8/1962 | Hackhel et al. | 206—45.34 |
| 2,561,010 | 7/1951 | Carson | 206—45.31 |

LEWIS T. JACOBS, Primary Examiner

U.S. Cl. X.R.

206—45.33